United States Patent [19]

Kan

[11] 3,723,366

[45] *Mar. 27, 1973

[54] CARBODIIMIDE FOAMS AND IMPROVED PROCESS FOR PREPARING SAME

[75] Inventor: Peter T. Kan, Wyandotte, Plymouth, Mich.

[73] Assignee: BASF Wyandotte Corporation, Wyandotte, Mich.

[*] Notice: The portion of the term of this patent subsequent to Feb. 28, 1989, has been disclaimed.

[22] Filed: June 25, 1971

[21] Appl. No.: 157,025

Related U.S. Application Data

[63] Continuation-in-part of Ser. No. 28,555, April 13, 1970, abandoned.

[52] U.S. Cl....260/2.5 BF, 260/2.5 AC, 260/2.5 AW, 260/2.5 BD
[51] Int. Cl.............................C08g 22/44, C08g 22/36
[58] Field of Search......260/2.5 AC, 2.5 AW, 2.5 BF

[56] References Cited

UNITED STATES PATENTS

| | | | |
|---|---|---|---|
| 2,853,473 | 9/1958 | Campbell | 260/77.5 |
| 2,941,966 | 6/1960 | Campbell | 260/2.5 |
| 3,502,722 | 3/1970 | Neumann | 260/566 |
| 3,462,381 | 8/1969 | Eaton | 260/2.5 |
| 2,993,870 | 7/1961 | Burkus | 260/2.5 |
| 3,657,161 | 4/1972 | Bernard | 260/2.5 |
| 3,645,923 | 2/1972 | Kan | 260/2.5 |
| 3,620,986 | 11/1971 | Diehr | 260/2.5 |
| 3,580,868 | 5/1971 | Diehr | 260/2.5 |

Primary Examiner—Donald E. Czaja
Assistant Examiner—C. Warren Ivy
Attorney—Robert E. Dunn, Joseph D. Micheals, Robert M. Phipps and Bernhard R. Swick

[57] ABSTRACT

Rigid foam compositions characterized by carbodiimide linkages are prepared from the catalytic condensation of an organic polyisocyanate in the presence of a co-catalyst system consisting essentially of a mixture of 2,4,6-tris (dialkanolamino)-s-triazine and 1,3,5-tris(N,N-dialkylaminoalkyl)-s-hexahydrotriazine.

8 Claims, No Drawings

CARBODIIMIDE FOAMS AND IMPROVED PROCESS FOR PREPARING SAME

CROSS-REFERENCE TO RELATED APPLICATION

This application is a continuation-in-part of copending U.S. Pat. application Ser. No. 28,555, filed Apr. 13, 1970, now abandoned and entitled "Carbodiimide Foams and Improved Process for Preparing Same."

BACKGROUND OF THE INVENTION

1. Field of the Invention

The present invention concerns cellular foam compositions and methods of preparation therefor. More particularly, the present invention concerns novel carbodiimide foam compositions and methods of preparation therefor. Even more particularly, the present invention concerns novel carbodiimide foam compositions prepared from the catalytic condensation of an organic polyisocyanate.

2. Prior Art

In copending patent application U.S. Ser. No. 5,985 entitled "Carbodiimide Foam Composition and Process of Preparation Thereof," filed Jan. 26, 1970 now U.S. Pat. No. 3,645,923, the disclosure of which is hereby incorporated by reference, there is disclosed therein novel rigid foam compositions characterized by carbodiimide linkages, which exhibit excellent flame retardancy and which are useful in most areas heretofore reserved for polyurethane foams and the like. These foams are prepared by catalytically condensing an organic polyisocyanate in the presence of a catalytically sufficient amount of a 2,4,6-tris(dialkanolamino)-s-triazine catalyst. The condensation reaction is conducted at a temperature ranging from about 70° to 200° C. and preferably at atmospheric pressure. Although the method of preparation of these compositions is quite efficient and worthwhile, it is necessary to supply external heat. From a practical and economic standpoint, it is desirable in many instances to prepare carbodiimide foam compositions by a process which can be carried out without supplying external heat.

SUMMARY OF THE INVENTION

The present invention provides a process for preparing rigid carbodiimide foams without supplying external heat by utilizing a unique co-catalyst system. The co-catalyst system which affords this result consists essentially of a 2,4,6-tris(dialkanolamino)-s-triazine and a 1,3,5-tris(N,N-dialkylaminoalkyl)-s-hexahydrotriazine, each being present in catalytically sufficient quantities. Thus, the present invention is seen to provide rigid carbodiimide foam compositions by the catalytic condensation of an organic polyisocyanate in the presence of a catalytically sufficient amount of a co-catalyst system consisting essentially of a 2,4,6-tris(dialkanolamino)-s-triazine and a 1,3,5-tris(N,N-dialkylaminoalkyl)-s-hexahydrotriazine wherein it is not necessary to supply external heat.

For a more detailed description of the present invention reference is made to the following detailed description and examples thereof.

DESCRIPTION OF THE PREFERRED EMBODIMENTS

In accordance with the present invention, novel rigid foam compositions are prepared from the catalytic condensation of an organic polyisocyanate in the presence of a 2,4,6-tris(dialkanolamino)-s-triazine and 1,3,5-tris(N,N-dialkylaminoalkyl)-s-hexahydrotriazine co-catalyst system. It appears that the foam forming reaction of the present invention proceeds in accordance with the following equation:

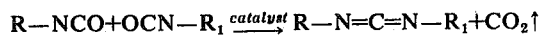

$$R-NCO + OCN-R_1 \xrightarrow{catalyst} R-N=C=N-R_1 + CO_2 \uparrow$$

wherein R and $R_1$ are each polyvalent organic radicals which may be the same or different. The evolution of carbon dioxide by the reaction provides a sufficient blowing agent for inducing and promoting foam formation. Thus, one readily apparent advantage of the present invention is seen to be the elimination of the need for the addition of any blowing agents to the reaction. Furthermore, the reaction is exothermic and the heat generated therefrom also promotes foam formation. But it is the self-evolution of carbon dioxide which is essential in the formation of the foams of the present invention.

The precise mechanism by which the co-catalyst system promotes foam formation in the present invention is not known. However, it is quite plausible that the carbodiimide linkages are formed indirectly from isocyanurate ring formation. More particularly, it appears that initially some of the —NCO groups are trimerized thereby forming isocyanurate rings. This reaction is highly exothermic and the heat generated thereby works in conjunction with the triazine component of the co-catalyst system to promote the carbodiimide formation from the remaining —NCO groups provided by the organic polyisocyanate. The basis for this explanation lies in the fact that hexahydrotriazines are known to be isocyanate trimerization catalysts. See, for instance, Nicholas et al., *Journal of Cellular Plastics*, 1 (1), 85 (1965). Furthermore, as noted above, the triazines are known to be catalysts for carbodiimide formation.

As stated above, the foam compositions of the present invention are characterized by N=C=N linkages. Less dominant groups within the foams are —NCO and the above-noted isocyanurate rings or linkages. However, it is the carbodiimide linkages which are critical hereto and which impart the excellent physical properties to the foam composition of the present invention.

The organic polyisocyanates which are advantageously employed in the present invention can be presented by the formula:

$$R(NCO)_z$$

wherein R is a polyvalent organic radical selected from the group of aliphatic, aromatic and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate, and the like; the aromatic triisocyanates such as 4,4',4''-triphenylmethylene triisocyanate; the aromatic tetraisocyanates, and the like; alkylaryl polyisocyanates such as xylylene diisocyanate; aliphatic polyisocyanates such as lysine diisocyanate methyl ester and the like; and mixtures thereof.

These polyisocyanates are prepared by conventional methods known in the art such as the phosgenation of the corresponding organic amine.

Still another class of organic polyisocyanates contemplated by the present invention are the so-called "quasi-prepolymers." These quasi-prepolymers are prepared by reacting an excess of any of the above-enumerated organic polyisocyanates or mixtures thereof with a minor amount of an organic polyol. These polyols, which can be either polyether polyols or polyester polyols, and their methods of preparation are well known in the art. The use of any one specific polyol is not critical hereto, rather any polyol that can be used to prepare a quasi-prepolymer can be employed herein. Generally speaking, the quasi-prepolymers are prepared by reacting an organic polyisocyanate with a minor amount, usually about 5 percent to 15 percent by weight, based on the weight of the polyisocyanate, of the polyol.

In the practice of the present invention, it is preferred to employ an 80:20 mixture of 2,4- and 2,6-toluene diisocyanate. Alternatively, it is preferred to employ a mixture of 2,4- and 2,6-toluene diisocyanate and crude diphenyl methylene diisocyanate. This mixture generally consists of from about 50 to 95 percent by weight of the 2,4- and 2,6-toluene diisocyanate and from about 5 to 50 percent by weight of crude diphenyl methylene diisocyanate.

The triazine component of the co-catalyst system employed in the present invention, as hereinbefore noted, consists of a 2,4,6-tris(dialkanolamino)-s-triazine. Examples of the catalyst include 2,4,6-tris(diethanolamino)-s-triazine, 2,4,6-tris(diisopropanolamino)-s-triazine, 2,4,6-tris(dibutanolamino)-s-triazine and the like as well as mixtures thereof. In fact, any of the homologs of 2,4,6-tris(diethanolamino)-s-triazine exhibit utility in the present invention. It is preferred, however, to employ 2,4,6-tris(diethanolamino)-s-triazine. Preparation of the triazine component generally comprises condensing cyanuric chloride with the selected dialkanolamine in the presence of a neutralizing amount of sodium hydroxide. Thus, for example, 2,4,6-tris(diethanolamino)-s-triazine is prepared from the condensation of diethanolamine and cyanuric chloride in the presence of a neutralizing amount of sodium hydroxide. The triazine compounds and their methods of preparation are more fully described by Kaiser et al., *Journal of the Americal Chemical Society*, v. 73, p. 2984 (1951).

The hexahydrotriazine component of the co-catalyst system consists of a 1,3,5-tris(N,N-dialkylaminoalkyl)-s-hexahydrotriazine. Representative examples of this component include, for example, 1,3,5-tris(N,N-dimethyl-2-aminoethyl)-s-hexahydrotriazine; 1,3,5-tris(N,N-dimethyl-3-aminopropyl)-s-hexahydrotriazine and the like; 1,3,5-tris(N,N-diethyl-2-aminoethyl)-s-hexahydrotriazine; 1,3,5-tris(N,N-diethyl-3-aminopropyl)-s-hexahydrotriazine and the like; 1,3,5-tris(N,N-dipropyl-2-aminoethyl)-s-hexahydrotriazine and the like; and so forth. In the practice of the present invention, it is preferred to employ 1,3,5-tris(N,N-dimethyl-3-aminopropyl)-s-hexahydrotriazine.

The hexahydrotriazine component of the co-catalyst system is generally prepared by reacting at a temperature of about 0° to 20° C. and at atmospheric pressure, equimolar amounts of a dialkylaminoalkylamine and a 37 percent aqueous solution of formaldehyde. More particularly, the amine and the formaldehyde are mixed together with gentle stirring at about 0° C. Thereafter, and with continuous gentle stirring the resulting mixture is allowed to heat up to room temperature. The hexahydrotriazine is then recovered by first salting out the hexahydrotriazine from the mixture with potassium hydroxide and then purifying by distillation. Thus, for example, 1,3,5-tris(N,N-dimethyl-3-aminopropyl)-s-hexahydrotriazine is prepared by mixing together at 0° C. dimethylaminopropylamine and a 37 percent aqueous solution of formaldehyde. After reaching room temperature, the resultant mixture has added thereto potassium hydroxide and thereafter the hexahydrotriazine is separated and recovered by distillation. These hexahydrotriazine components and their method of preparation are more particularly described by Nicholas et al, supra, and by Graymore, *Journal of the Chemical Society*, 1493 (1931).

Generally, the co-catalyst system of the present invention is employed in a weight ratio of the hexahydrotriazine catalyst to the triazine catalyst ranging from about 1:7 to 7:1. Preferably, a weight ratio of hexahydrotriazine to triazine ranging from about 1:3 to 1:5 is employed herein.

In the preparation of the foam compositions of the present invention, generally, from about 0.1 to 10 parts by weight of co-catalyst system, per 100 parts by weight of organic polyisocyanate, is employed. Preferably, from about 0.5 to 3.0 parts by weight of co-catalyst system, per 100 parts by weight of organic polyisocyanate, is utilized.

In a preferred embodiment of the present invention, where sufficient agitation is used to provide rapid dispersion and intimate mixing of the reactants, a blend of the two co-catalysts is employed and added to the isocyanate simultaneously.

Alternatively, and in another preferred embodiment of the present invention, the present foam compositions are prepared by adding together, with gentle or moderate agitation and without supplying external heat, the organic polyisocyanate and the triazine catalyst. Thereafter, the hexahydrotriazine is added to the polyisocyanate and the triazine. When using gentle agitation, it is preferred to combine the ingredients in this manner for two reasons: (1) if the co-catalyst system was used as a mixture and added together to the polyisocyanate the reaction would be uncontrollable, this in turn would result in (2) non-homogeneous foam compositions. Thus, the co-catalyst system is added to the polyisocyanate as two separate ingredients, when gentle agitation is used.

With the addition of the co-catalyst system to the polyisocyanate the reaction commences almost spontaneously and usually begins in about 2 to 10 seconds. Commencement of the reaction is evidenced by an increase in temperature within the reaction vessel because of the exothermic nature of the reaction. Generally, the temperature will rise to a temperature of about 100° to 200° C. In addition to the increase in temperature, the reaction is also evidenced by the evolution of carbon dioxide. After about 1 to 10 minutes the reaction is completed. The time necessary to complete the reaction is, of course, dependent on the type and the amount of polyisocyanate and the amount of co-catalyst system employed.

Various other ingredients can be incorporated into the rigid foams of the present invention to enhance the properties thereof. For example, minor amounts of active ingredients such as organic polyols can be employed. Generally, from about 1 to 20 parts by weight of polyol per 100 parts by weight of polyisocyanate can be used herein. In addition, various surfactants, plasticizers and filler materials can also be employed herein in amounts ranging from 1 to 75 parts by weight of each per 100 parts by weight of polyisocyanate.

The organic polyols that can be used as a separate ingredient are the same as those used in the formation of the above-mentioned "quasi-prepolymer." Exemplifying such organic polyols are the polyhydric alcohols, the polyether polyols prepared by oxyalkylating polyhydric alcohols; polyoxyalkylene polyols; polyester polyols prepared from the reaction of a polycarboxylic acid and a polyhydric alcohol; the oxyalkylation adducts of the polyester polyols; various phosphorus containing polyols and the like. Also included within the possible polyols are the mercapto-compounds such as dithiols and the like as well as amino-compounds such as amino alcohols, amines, amides and the like.

Representative of the surfactants are the well-known silicon-based polysiloxane surfactants.

Filler materials such as calcium carbonate, barium sulfate, calcium oxide and the like can also be employed in the foam preparation. Also, plasticizers such as tris(beta-chloroethyl) phosphate and dioctyl phthalate are contemplated for use herein.

The final foam products obtained by the practice of the present invention generally have densities ranging from about 0.5 to 20.0 pounds per cubic foot and usually from about 0.8 to 16.0 pounds per cubic foot. These foam compositions, which are rigid cellular plastics, are suitable replacements for the heretofore known foams in many applications such as insulating materials and the like. In addition, it has been found that these foam compositions exhibit excellent flame retardancy and low smoke densities.

To more fully illustrate the present invention, following are specific examples of the present invention which are not to be construed as being unduly limitative thereof. In the examples, all parts are by weight, absent indications to the contrary.

EXAMPLES 1–18

A plurality of rigid carbodiimide foams were prepared at atmospheric pressure without supplying or removing heat in accordance with the following procedure:

To a suitable reaction vessel equipped with agitation means was added with gentle agitation an organic polyisocyanate and a catalytic quantity of a 2,4,6-tris(dialkanolamino)-s-triazine catalyst. In those instances wherein various other ingredients such as fillers, plasticizers and the like were also employed, they were added to the reaction vessel along with the organic polyisocyanate and the triazine catalyst. Immediately after these ingredients were placed and mixed in the vessel, a catalytic quantity of a 1,3,5-tris(N,N-dialkylaminoalkyl)-s-hexahydrotriazine compound was rapidly added thereto. Almost immediately after the hexahydrotriazine came into contact with the ingredients in the vessel, carbon dioxide was evolved therefrom accompanied with a rise in temperature within the vessel. This exothermic reaction reached a maximum temperature, in all instances, of from about 100° to 200° C. Within a few seconds after the hexahydrotriazine was added to the vessel the reaction was completed and a rigid foam characterized by carbodiimide linkages was thereby obtained.

The following table, Table I, sets forth the ingredients used to prepare rigid foams in accordance with the present invention. In the table, except where otherwise indicated, the triazine component of the co-catalyst system, denoted in the table as TDT, consisted of 2,4,6-tris(diethanolamino)-s-triazine and the hexahydrotriazine component, denoted in the table as TDH, was 1,3,5-tris(N,N-dimethyl-3-aminopropyl)-s-hexahydrotriazine. Also, except where otherwise indicated, the organic polyisocyanate reactant, denoted in the table as TDI, was an 80:20 mixture of 2,4- and 2,6-toluene diisocyanate.

TABLE I
[Room temperature initiated carbodiimide foams]

| Example | Isocyanate reactant | | Polyol reactant | | Catalyst (parts) | | Plasticizer [1] (parts) | Surfactant [2] (parts) | DPEDA [3] (parts) | CaO, as filler (parts) | CaCO₃, as filler (parts) | BaSO₄ as filler (parts) |
|---|---|---|---|---|---|---|---|---|---|---|---|---|
| | Isocyanate | Parts | Polyol | Parts | TDT | TDH | | | | | | |
| 1 | TDI | 50 | | | 0.25 | 0.25 | | | | | | |
| 2 | TDI | 50 | | | 0.38 | 0.12 | | | | | | |
| 3 | TDI | 50 | | | 0.76 | 0.24 | | | | | | |
| 4 | TDI | 50 | | | 0.38 | 0.12 | 2.5 | | | | | |
| 5 | TDI | 50 | | | 0.76 | 0.24 | 2.5 | 0.25 | | | | |
| 6 | TDI | 50 | | | ⁴0.50 | 0.20 | 2.5 | 0.25 | | | | |
| 7 | TDI | 50 | | | 1.00 | 0.48 | 2.5 | 0.25 | | | | |
| 8 | TDI | 50 | | | 0.76 | 0.24 | 2.5 | 0.25 | 1.0 | | | |
| 9 | TDI | 50 | | | 0.76 | 0.24 | 2.5 | 0.25 | | 5.0 | | |
| 10 | TDI | 50 | | | 0.76 | 0.24 | 2.5 | 0.25 | | | 5.0 | |
| 11 | TDI | 50 | | | 0.76 | 0.24 | 2.5 | 0.25 | | | | |
| 12 | TDI | 50 | A⁵ | 5 | 0.76 | 0.24 | 2.5 | 0.25 | | | | |
| 13 | TDI | 50 | B⁶ | 5 | 0.76 | 0.25 | 2.5 | 0.25 | | | | |
| 14 | TDI | 50 | C⁷ | 5 | 0.76 | 0.24 | 2.5 | 0.25 | | | | |
| 15 | TDI | 50 | D⁸ | 5 | 0.76 | 0.24 | 2.5 | 0.25 | | | | |
| 16 | {TDI / MDI⁹} | 33 / 17 | | | 1.50 | 0.48 | 2.5 | 0.25 | | | | |

TABLE I —Continued
[Room temperature initiated carbodiimide foams]

| Example | Isocyanate reactant | | Polyol reactant | | Catalyst (parts) | | Plasti-cizer [1] (parts) | Surfac-tant [2] (parts) | DPEDA [3] (parts) | CaO, as filler (parts) | CaCO$_3$, as filler (parts) | BaSO$_4$ as filler (parts) |
|---|---|---|---|---|---|---|---|---|---|---|---|---|
| | Isocyanate | Parts | Polyol | Parts | TDT | TDH | | | | | | |
| 17 | TDI | 33 | | | 1.50 | 0.72 | 2.5 | 0.25 | | | | |
|    | MDI | 17 | | | | | | | | | | |
| 18 | Prepolymer [10] | 50 | | | 0.76 | 0.24 | 2.5 | 0.25 | | | | |

[1] Plasticizer is tris(beta-chloroethyl)phosphate.
[2] Surfactant is a polysiloxane surfactant.
[3] DPEDA = N,N-diphenylethylenediamine as a reactive additive.
[4] A solution of 2,4,6-tris(diethanolamino)-s-triazine in dimethylformamide.
[5] Polyol A = A polyoxypropylene glycol having an average molecular weight of about 425 and prepared by oxypropylating a propylene glycol.
[6] Polyol B = A polyoxypropylene glycol having an average molecular weight of about 775 and prepared by oxypropylating a propylene glycol.
[7] Polyol C = A polyoxypropylene glycol having an average molecular weight of about 1,050 and prepared by oxypropylating a propylene glycol.
[8] Polyol D = A polyoxypropylene glycol having an average molecular weight of about 2,000 and prepared by oxypropylating a propylene glycol.
[9] MDI = Crude methylene diphenyldiisocyanate.
[10] Prepolymer = An NCO-terminated prepolymer prepared by reacting in a 10:1 weight ratio an 80:20 mixture of 2,4-and 2,6-toluene diisocyanate and a polyol consisting of a polyoxypropylene glycol having an average molecular weight of 500 prepared by oxypropylating a propylene glycol.

EXAMPLES 19-22

These examples illustrate the preparation of a carbodiimide foam utilizing a blend of the co-catalysts in accordance with the following procedure.

To a suitable reaction vessel equipped with agitation means was added an organic polyisocyanate. While vigorously agitating the polyisocyanate there was added thereto a blend of co-catalyst previously prepared by mixing the two co-catalysts together. The blend was immediately dispersed in the polyisocyanate and almost immediately thereafter a reaction began as evidenced by the development of an exotherm and the evolution of carbon dioxide.

After a few seconds the reaction ceased and a rigid foam product characterized by carbodiimide linkages was obtained.

In preparing these foams, the surfactant and plasticizer, where used, were added with the co-catalyst blend, the surfactant and plasticizer having been previously premixed therewith to facilitate their introduction.

TABLE II
[ROOM TEMPERATURE INITIATED FOAMS FROM CO-CATALYST BLEND]

| Example | Isocyanate reactant | | Catalyst (parts) | | Surfact-ant [5] (parts) | Plasti-cizer [6] (parts) | Foam density, lbs./ft.$^3$ | Exotherm, °C. |
|---|---|---|---|---|---|---|---|---|
| | Isocyanate | Parts | TDT [3] | TDH [4] | | | | |
| 19 | TDI [1] | 100 | 1.2 | 0.6 | 0.40 | 0.80 | 1.2 | 155 |
| 20 | TDI | 80 | 1.2 | 0.6 | 0.40 | 0.80 | 2.1 | 176 |
|    | MDI [2] | 20 | | | | | | |
| 21 | TDI | 60 | 1.6 | 0.8 | 0.53 | 1.07 | 2.8 | 162 |
|    | MDI | 40 | | | | | | |
| 22 | TDI | 40 | 2.4 | 1.2 | 0.80 | 1.60 | 4.7 | 127 |
|    | MDI | 60 | | | | | | |

[1] An 80:20 weight mixture of 2,4- and 2,6-toluene diisocyanate.
[2] Crude methylene diphenyldiisocyanate.
[3] 2,4,6-tris(diethanolamino)-s-triazine.
[4] 1,3,5-tris(N,N-dimethyl-3-aminopropyl)-s-hexahydrotriazine.
[5] Surfactant is a polysiloxane surfactant.
[6] Plasticizer is tris(beta-chloroethyl) phosphate.

What is claimed is:

1. A process for the manufacture of a rigid cellular foam characterized by carbodiimide linkages comprising catalytically condensing an organic polyisocyanate or a mixture of organic polyisocyanates in the presence of a catalytically sufficient amount of a co-catalyst system consisting essentially of a mixture of a 2,4,6-tris(dialkanolamino)-s-triazine and a 1,3,5-tris(N,N-dialkylaminoalkyl)-s-hexahydrotriazine.

2. The process of claim 1 wherein the co-catalyst system is present in a weight ratio of from 0.1 to 10 parts of co-catalyst system per 100 parts of organic polyisocyanate.

3. The process of claim 2 wherein the co-catalyst system is employed in a weight ratio of hexahydrotriazine catalyst to triazine catalyst ranging from about 1:7 to 7:1.

4. The process of claim 3 wherein the 2,4,6-tris(dialkanolamino)-s-triazine is selected from the group consisting of 2,4,6-tris(diethanolamino)-s-triazine, 2,4,6-tris(diisopropanolamino)-s-triazine, and mixtures thereof.

5. The process of claim 3 wherein the 2,4,6-tris(dialkanolamino)-s-triazine is 2,4,6-tris(diethanolamino)-s-triazine.

6. The process of claim 3 wherein the 1,3,5-tris(N,N-dialkylaminoalkyl)-s-hexahydrotriazine is 1,3,5-tris(N,N-dimethyl-3-aminopropyl)-s-hexahydrotriazine.

7. The process of claim 1 wherein the organic polyisocyanate is represented by the formula:

$$R(NCO)_z$$

wherein R is a polyvalent organic radical selected from the group consisting of aliphatic and aromatic radicals and z is an integer corresponding to the valence of R and is at least 2.

8. The process of claim 7 wherein the organic polyisocyanate is selected from the group consisting of toluene diisocyanate, methylene diphenyl diisocyanate, xylylene diisocyanate, lysine diisocyanate methyl ester and mixtures thereof.

* * * * *